(12) United States Patent
Golden

(10) Patent No.: US 10,530,845 B1
(45) Date of Patent: Jan. 7, 2020

(54) SHUFFLE SHARDED LOAD BALANCING

(71) Applicant: AMAZON TECHNOLOGIES, INC., Seattle, WA (US)

(72) Inventor: Robin Alan Golden, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 15/464,854

(22) Filed: Mar. 21, 2017

(51) Int. Cl.
*H04L 29/08* (2006.01)
*H04L 12/911* (2013.01)
*H04L 12/26* (2006.01)

(52) U.S. Cl.
CPC .......... *H04L 67/1002* (2013.01); *H04L 43/16* (2013.01); *H04L 47/70* (2013.01); *H04L 67/32* (2013.01)

(58) Field of Classification Search
CPC ..... H04L 67/32; H04L 67/1002; H04L 43/16; H04L 47/70
USPC .................. 709/201, 226, 223, 238
See application file for complete search history.

(56) References Cited

U.S. PATENT DOCUMENTS

| | | | |
|---|---|---|---|
| 10,212,041 B1* | 2/2019 | Rastogi | ................... H04L 41/12 |
| 2016/0381128 A1* | 12/2016 | Pai | ...................... H04L 67/1008 709/203 |

OTHER PUBLICATIONS

"Shuffle Sharding: massive and magical fault isolation." AWS Architecture Blog. Apr. 14, 2014. Web. Jun. 20, 2017. <https://www.awsarchitectureblog.com/2014/04/shuffle-sharding.html>.

* cited by examiner

*Primary Examiner* — Chirag R Patel
*Assistant Examiner* — Marshall M McLeod
(74) *Attorney, Agent, or Firm* — Blank Rome LLP

(57) ABSTRACT

A system includes a plurality of computing devices configurable to implement a compute instance of a provider network. A computing device is configured to implement a load balancer that allocates the computing devices to service requests received by the load balancer. The load balancer configured to receive service requests from a plurality of sources, to extract a parameter from each received service request, to select, based on the parameter, a first subset of the plurality of computing devices to be used to service the request, and to forward the request to a selected computing device of the first subset of the computing devices for service.

18 Claims, 10 Drawing Sheets

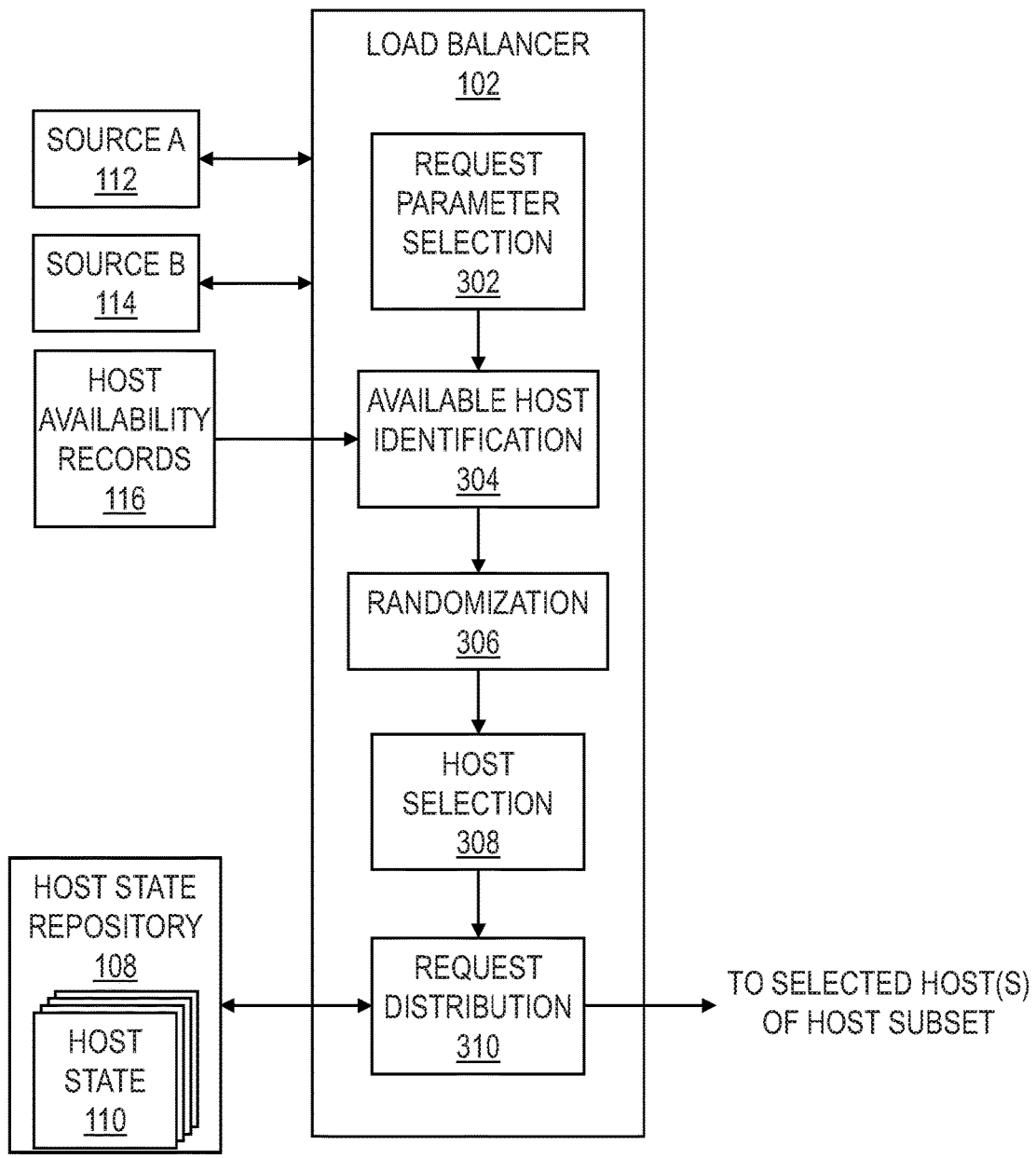

SHUFFLE SHARDED LOAD BALANCING

BACKGROUND

In network-based computing environments, multiple computers may be employed to manage incoming service requests. Load balancers may be used to distribute the service requests across the multiple computers. Distributing the service requests across the computers helps optimize resource utilization, maximize throughput, and avoid overload of any one of the computers. Typically, a load balancer receives a request from a client device, selects one of the multiple computers to service the request, and routes the request to the selected computer, which processes the request and issues a response. Load balancers generally attempt to distribute the request load evenly across all of the service computers in an effort to prevent any individual computer from being overloaded with requests.

BRIEF DESCRIPTION OF THE DRAWINGS

For a detailed description of various examples, reference will now be made to the accompanying drawings in which:

FIG. 3 shows a block diagram of a load balancer that includes shuffle sharding in accordance with various embodiments;

DETAILED DESCRIPTION

Figure 1:
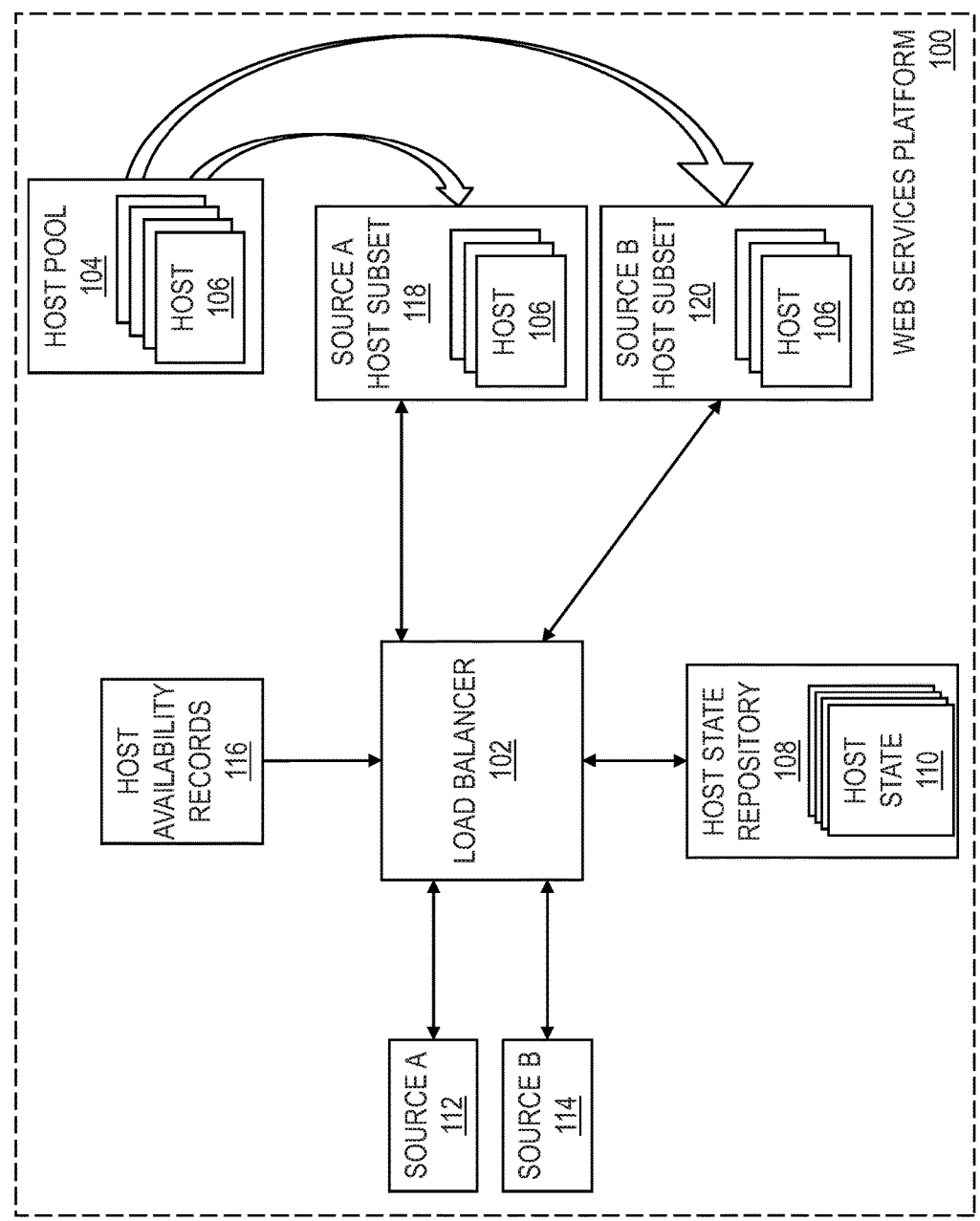
FIG. 1 shows a schematic diagram of a web services platform that includes a shuffle sharded load balancer in accordance with various embodiments.

The present disclosure is directed to increasing the availability and responsiveness of services in a web-based computing system. More specifically, in the computing system disclosed herein, the load balancers employ shuffle sharding to provide a set of host resources for use in servicing a request. As used herein, the term "shard" refers to a set or group of resources that are a proper subset of the resources available to service a request. The resources assigned to a shard are randomly selected from the available resources, thus the resources assigned to the shard may be described as selected from a shuffled set of the available resources. By randomly selecting the resources assigned to a shard, the load balancer provides a large number of resource combinations that reduce the probability that an issue in one shard affects operation of another shard to any great degree. The load balancer applies the host resources of the shuffle shard to service a received request. Because any detrimental effects of servicing the request are isolated to a given shard, the servicing of requests by other shards may be insulated from faults arising in the given shard. For example, if a user to which the load balancer assigns the given shard issues requests at a rate that overwhelms the processing capacity of the resources assigned to the given shard, other shards that include a different set of resources may be unaffected. In contrast, in a system that lacks sharding, the poorly behaved requestor may inundate all available resources thereby affecting the operations of all other users of the resources. While throttling may provide some relief in such a scenario, if the requests expose a flaw in operation of the resources, then providing the requests across the available resources may result in failure of the complete resource set.

In a web-based computing system, a load balancer may be virtualized and distributed to execute on any number of host devices. Such a load balancer may process service requests from any number of users, where users may be internal to or external to the web-based computing system. Embodiments of the shuffle sharded load balancer disclosed herein may apply shuffle sharding to isolate the processing of requests received from each user to a different subset of the hosts available to service requests received from all users. For example, when an embodiment of the load balancer receives a service request from a user, the load balancer may extract from the service request one or more values for use in selecting a subset of the available hosts to process the service request. The values may be indicative of the source of the request. For example, the value may be a source identification value (e.g., a customer ID, a user ID), a source address value (e.g., an internet protocol address (IP)), or other source unique value. In some embodiments, the load balancer may produce a value for use in selecting a subset of the available hosts to process the service request based on more than one value extracted from the request. For example, the load balancer may extract from a received request a source identification value and value indicative of the requested service. The load balancer may combine the source identification value and the service identification value to produce a parameter indicative of the source-service combination. Some embodiments of the load balancer may extract other values from the service request and combine the values. In any case, the load balancer applies the value(s) extracted from the service request to randomize the hosts assigned to the shard.

Load balancer selection of the hosts assigned to the shard may employ a pseudo-random value generator (referred to herein as a random number generator) that produces a same sequence of values when initialized with a same seed value. The load balancer may apply the value extracted from the service request (e.g., the source identification value) as the seed value to the random number generator. The values generated by the random number generator may be used select the hosts to be included in the shard. For example, having seeded the random number generator with the source ID of the received request, the load balancer may retrieve a list identifying the hosts available for use. The load balancer may employ index values generated from the random numbers provided by the random number generator to reorder the list of available hosts. The load balancer may select the hosts to assign to a shard from the reordered host list. For example, if the shard is to include five hosts, then the load balancer may select the first five hosts of the reordered host list to assign to the shard. In this way, for a given source identification value received from a given source, all requests received from the given source for a particular service, etc. (i.e., all requests producing the same seed value) may be serviced by a shard that includes a same subset of the available hosts. A shard will include more than one host and fewer than all available hosts. Thus, a shard is a proper subset of the available hosts.

Some embodiments of the shuffle sharded load balancer constrain the hosts selected for inclusion in a shard to promote a higher degree of uniqueness across shards. For example, host selection may ensure that no more than a predetermined number of hosts are overlapping across shards (e.g., 5 of 6 hosts in a shard may overlap another shard). If host selection, as described above, results in a number of overlapping hosts that exceeds the predetermined allowable number of overlapping hosts, then the load balancer may replace one or more of the overlapping hosts with another host identified in the reordered list to produce a shard that conforms to the predetermined overlap specification. By constraining the degree of overlay between shards, the load balancer may ensure that a problem in one shard has limited effect on other shards. E.g., a problem servicing requests from one source has limited effect on the servicing of requests from any other source.

Embodiments of the shuffle sharded load balancer may also allocate multiple shards for servicing requests received from a given source. For example, the load balancer may maintain a list of sources that historically utilize a large quantity of host resources. On receipt of a service request, the load balancer may determine whether the request was generated by a source identified in the list. If so, then the load balancer may generate a first shard for servicing the request, modify the randomizer seed in a predetermined manner (e.g., add a constant to the seed value), reinitialize the random number generator, reorder the list of available hosts in accordance with the modified randomizer seed, and select hosts for a second shard. The hosts of the first and second shards may be combined to form a set of hosts used by the load balancer to service the request. In some embodiments, the load balancer may ensure that all selected hosts are unique across the first and second shards. Some embodiments of the load balancer may increase the number of hosts selected for the first shard rather than selecting a second shard. For example, after reordering the host list for selection of the first shard, the load balancer may select twelve hosts from the reordered list, rather than selecting six hosts from the reordered list.

Having selected the subset of hosts for servicing a request (i.e., the hosts assigned to a shard), the load balancer will select a host of the subset to which the request will be transferred for service. To select the host that will service the request, the load balancer retrieves state information for the hosts of the shard from a host state repository. The host state repository may be database or other storage structure that stores status information for the available hosts. The status information may include information detailing the health of the host, the number of connections being serviced by the host, information specifying which host of the shard was last selected for service, and other information. The load balancer may analyze the status information to determine which host of the shard to select for servicing the request. For example, a host denoted as in poor health may be excluded from selection. Discounting unhealthy hosts, load balancer may select the host having fewest connections to service the request, or may select a next host successive to the last host selected, or may select a host a random, or may select a host based on other criteria to service the request.

On selection of a host from the shard, the load balancer transfers the request to the host for service. Should service of the request by the selected host be unsuccessful, the load balancer may select another host of the shard to service the request.

FIG. 1 shows a schematic diagram of a web services platform 100 that includes a shuffle sharded load balancer 102 in accordance with various embodiments. In addition to the shuffle sharded load balancer 102, the web services platform 100 includes a host pool 104, host availability records 116, host state repository 108, source A 112, and source B 114. Source A 112 and source B 114 issue requests for service that are received by the load balancer 102 for distribution to a host 106 configured to service the request. While only source A 112 and source B 114 are shown in FIG. 1, in practice the web services platform 100 may include any number of sources that issue service requests received by the load balancer 102. The source A 112 and source B 114 may be physical or virtual computers that execute software for generation of service requests.

The host pool 104 includes a number of hosts 106 available for servicing the requests received by the load balancer 102. The host pool 104 may include any number of hosts 104, e.g., 50 hosts 106, 100 hosts 106, or more than 100 hosts 106. The hosts 106 may be physical or virtual computers. For example, each host 106 may be a virtual machine or container executed by a computer, the virtual machine or container configured to operate as a host for executing the applications that service the requests received by the load balancer 102.

The host availability records 116 provide information identifying the hosts 106 of the host pool 104 that are available for use in servicing the requests distributed by the load balancer 102. The host availability records may identify the available hosts 106 by an internet protocol address, an identification value assigned by the web service platform 100, a serial number value, and/or other unique identification value. In some embodiments of the web services platform 100, the host availability records 116 may be provided as domain name service (DNS) records stored in a DNS server that can be accessed by the load balancer 102. In some embodiments, the host availability records 116 may be stored in a database, such as a relational database, an object oriented database, a non-SQL database, or other database. In some embodiments, the host availability records 116 may be stored in any computer storage structure suitable for storing information usable to identify the hosts 106 available for servicing requests distributed by the load balancer 102.

The host state repository 108 stores host state records 110. The host state records 110 provide information regarding the state of each of the hosts 106 of the host pool 104. The information may include health values for each host 106 that indicate the operational condition of the host 106, e.g., faults detected in the host over time, host performance measurements, measured degradation of host performance, etc. The information may also include operational state and configuration data. For example, for each host 106 the information may specify the number of currently active connections to the host 106. The information may also record the sequence of service request distribution to each host 106 of each shard to facilitate round robin distribution of service requests.

On receipt of a service request from source A 102, the load balancer 102 extracts from the request values that will be used to select a subset of the hosts 106 of the host pool 104 that will be applied to service the request. For example, the load balancer 102 may extract from the request a value that identifies source A as the origin of the request. The load balancer 102 also retrieves the host availability records 116. The load balancer 102 analyzes the host availability records 116 to identify the set of all hosts 106 in the host pool 104 that may be used to service the request. The load balancer 102 applies the values extracted from the request to randomly select hosts 106 from the host pool 104 to assign to a shard that services the request.

FIG. 1 shows source A subset 118 that includes a number of hosts 106 selected by the load balancer 102 from the hosts 106 of the host pool 104 to service the request received from source A 112. The load balancer 102 may select the hosts 106 of the source A host subset 118 by ordering the set of all hosts 106 identified via the host availability records 116. The hosts 106 of the set of all hosts may be ordered in a variety of ways. For example, the hosts 106 may be ordered in sequence of ascending or descending host identification value, ascending or descending host IP address, or in any other order that can be repeated for all requests received by the load balancer 102. The load balancer 102 randomly selects from the ordered list of all hosts 106 to generate the source A host subset 118. For example, the load balancer 102 may apply the value(s) extracted from the received request as a seed to initialize a random number generator. The load balancer 102 may apply the random values produced by the initialized random number generator to select the hosts 106 from the ordered set of hosts 106. The load balancer 102 may apply the random values produced by the random number generator to shuffle the set of all hosts 106. For example, the random values may be applied as indices to randomly reorder the set of all hosts 106. The load balancer 102 may select a number of hosts 106 from the randomized set of hosts 106 to populate the source A host subset 118. For example, if the source A host subset 118 is to include N hosts 106, then the load balancer 102 may select the hosts 106 identified by a lowest N indices of the set of randomized hosts 106. In some embodiments, the load balancer 102 may apply a first N values produced by the random number generator to index the set of all hosts 106. Using this approach, the N hosts identified based on the first N values produced by the random number generator constitute the hosts 106 of the source A host subset. The load balancer 102 may select hosts 106 of the source B host subset 120 based on requests received in source B, and any other source, in similar fashion to selection of hosts 106 for the source A host subset 118. Because the hosts 106 of each subset are selected randomly based on information extracted from the requests, the hosts 106 assigned to each subset may differ while the hosts assigned to a given subset may be the same from request to request. The load balancer 102 may apply additional constraints to select the hosts 106 of a source subset as disclosed herein.

Given the subset of hosts 106 selected to service a received request, the load balancer 102 determines which host 106 of the subset is to service the request. For example, the load balancer 102 selects one of the hosts 106 of the source A host subset 118 to service a request received from source A. To select a host 106 from the source A subset 118, the load balancer 102 retrieves the host state information 110 for the hosts 106 of the source A subset 118 from the host state repository 108. The load balancer 102 analyzes the retrieved host state information 110 to determine which of the hosts 106 is to service the request. For example, the load balancer 102 may analyze health information for the hosts 106 and prioritize the hosts for selection in order of relative health. Analyzing health information of the hosts 106 may include comparing the health values (e.g., number of recorded faults) for each host 106, where number of faults is indicative of relative health. Similarly, the load balancer may analyze the connectivity of the hosts 106 of the source A host subset 118 based on the host state information 110, and select the host 106 of the source A host subset 118 having least connectivity to service the request received from source A 112.

Having selected one of the hosts 106 of the source A host subset 118 to service the request received from source A 112, the load balancer 102 passes the request to the selected host 106 for service. Should service of the request by the selected host 106 fail, the load balancer 102 may select a different host 106 of the source A host subset 118 and forward the request to the different host 106. For example, the load balancer 102 may time-out waiting for a response from the selected host 106 or receive status or a response from the selected host indicating service failure, which in either case may trigger selection of a different host 106 of the source A host subset 118 and forwarding of the request to the different host 106.

Figure 2A:
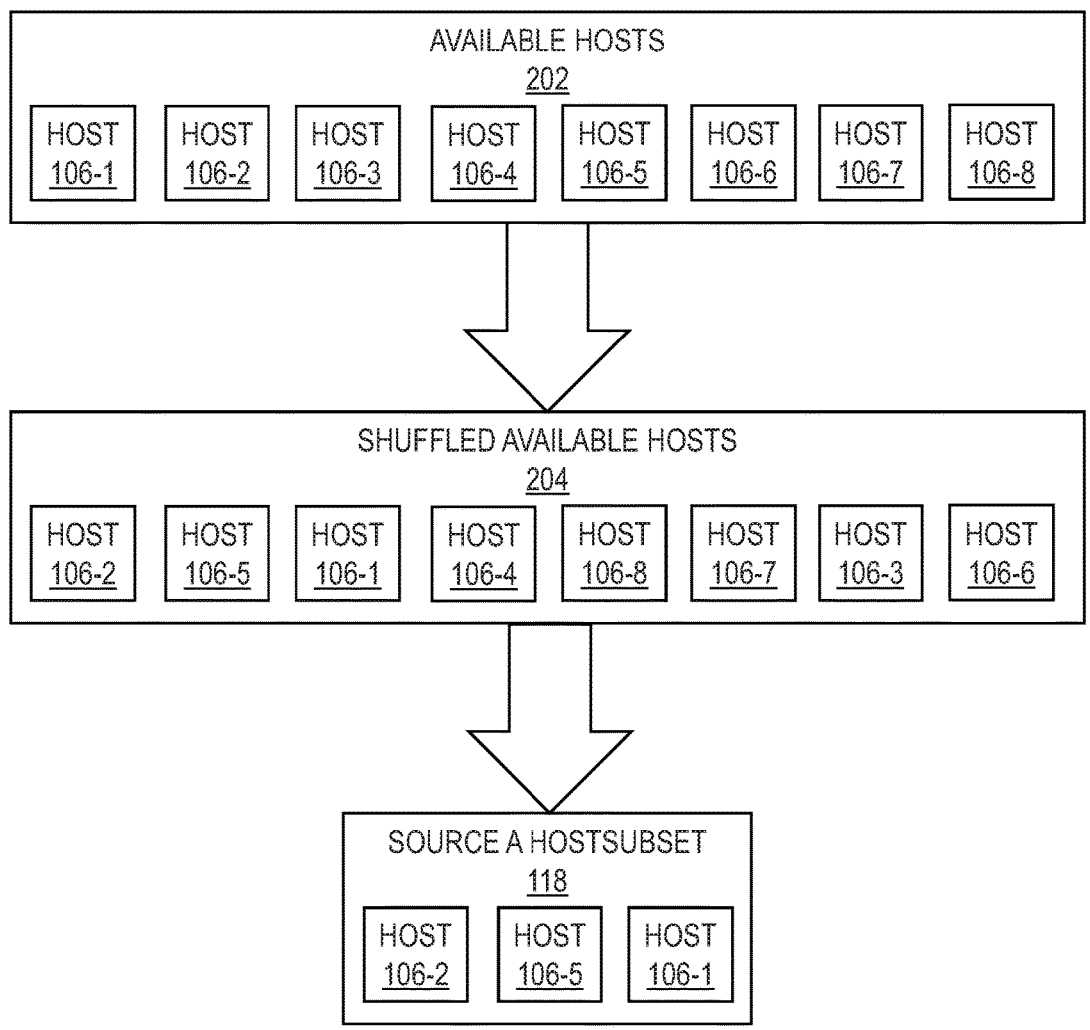
FIGS. 2A and 2B show examples of shuffle shards of service hosts produced from a host pool in accordance with various embodiments.
Figure 2B:
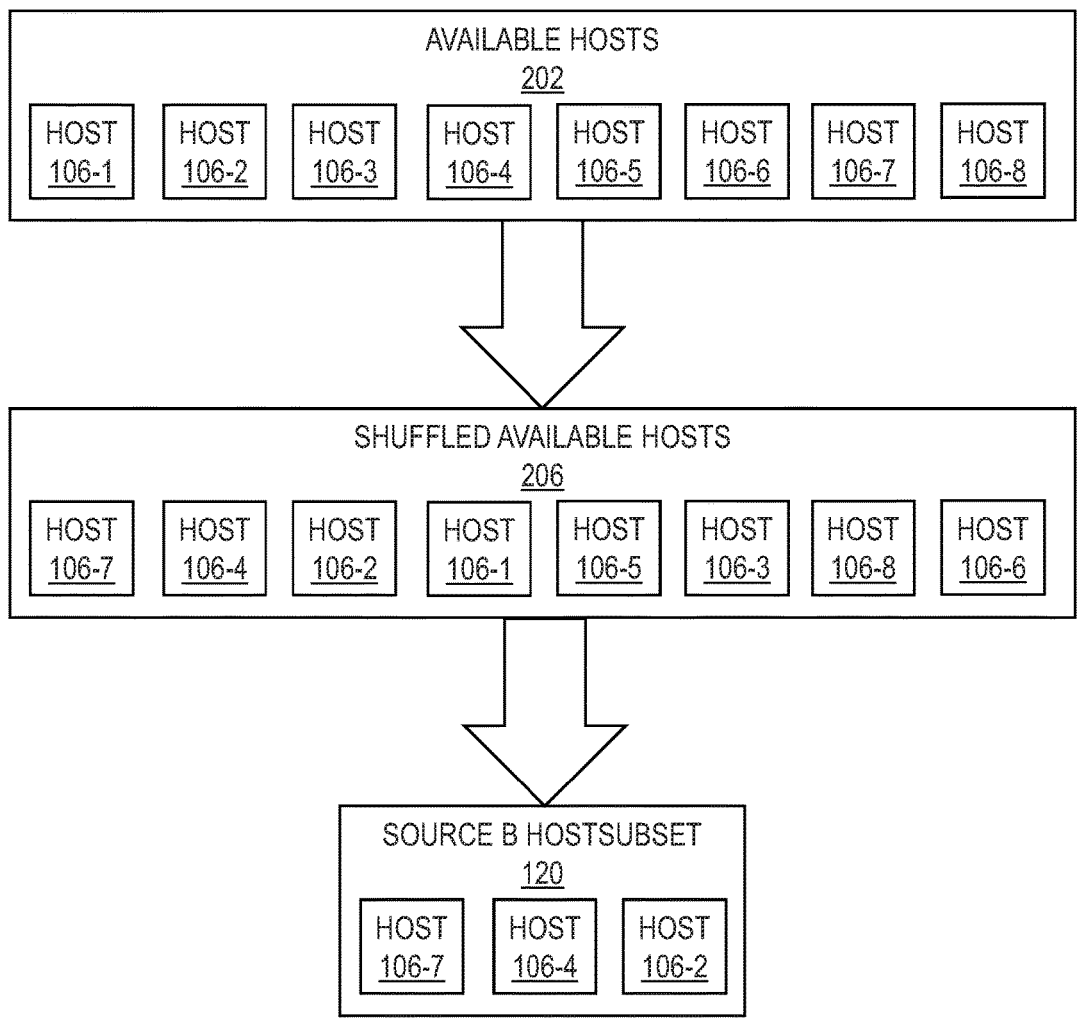

FIGS. 2A and 2B show example of shuffle shards of service hosts 106 produced from the host pool 104 in accordance with various embodiments. In FIG. 2A, the load balancer 102 has retrieved the host availability records 116 and ordered the hosts 106 of the host pool 104 in a list of available hosts 202. Based on the values extracted from a request received from source A 112, the load balancer 102 shuffles the list of available hosts 202 to produce the shuffled list of available hosts 204. If the list of available hosts 202 is the same across multiple requests, then the list of shuffled available hosts 204 will also be the same across the multiple requests based on same values extracted from the request being applied to initialize the random number generator that provides the randomizing values applied to shuffle the hosts 106. From a list of shuffled hosts 204 that remains the same across multiple requests, the load balancer 102 populates the source A host subset 118 with the same hosts 106 for servicing the multiple requests.

In FIG. 2B, the load balancer 102 has retrieved the host availability records 116 and ordered the hosts 106 of the host pool 104 in a list of available hosts 202. Based on the values extracted from the request received from source B 114, the load balancer 102 shuffles the list of available hosts 202 to produce the shuffled list of available hosts 206. Because the values extracted from the request received from source B is different from the values extracted from the request received from source A, the order of the hosts in the shuffled list of available hosts 206 is different from the order of the hosts in the shuffled list of available hosts 204. If the list of available hosts 202 is the same across multiple requests, then the list of shuffled available hosts 206 will also be the same across the multiple requests based on same value extracted from the request being applied to initialize the random number generator that provides the randomizing values applied to shuffle the hosts 106. From a list of shuffled hosts 206 that remains the same across multiple requests, the load balancer 102 populates the source B host subset 120 with the same hosts 106 for servicing the multiple requests.

FIG. 3 shows a block diagram of an embodiment of the load balancer 102. The load balancer 102 includes request parameter selection logic 302, available host identification logic 304, randomization logic 306, host selection logic 308, and request distribution logic 310. The request parameter selection logic 302 processes requests for service received by the load balancer 102. The request parameter selection logic 302 extracts from the requests the value(s) applied to randomize the selection of hosts 106 used to service the request. Some embodiments of the request parameter selection logic 302 extract source identification information from the request. For example, the request parameter selection logic 302 may extract a source ID value, a source IP address, or other source identification information from the received request. Some embodiments of the request parameter selection logic 302 extract service identification information from the request. For example, the request parameter selection logic 302 may extract from the request a value identifying the service requested. Some embodiments of the request parameter selection logic 302 may combine multiple values extracted from the received request. For example, the request parameter selection logic 302 may combine a value identifying the source of the request and a value identifying the service requested. The request parameter selection logic 302 may combine the multiple values by concatenation, addition, or any of a variety of other methods.

The available host identification logic 304 identifies a set of all hosts 106 that are available to be used for servicing a received request. On receipt of a request for service, the available host identification logic 304 accesses the host availability records 116 which provide information identifying the hosts 106 of the host pool 104 that are available for use in servicing requests. The available hosts may change over time to accommodate removal of hosts 106 from service, replacement of aging or faulty hosts 106, addition of new hosts 106 to the host pool 104, etc. In some embodiments, the available host identification logic 304 may access a DNS server to retrieve the host availability records 116. The host availability records 116 may be stored as DNS records in the DNS server. In some embodiments, the available host identification logic 304 may access a database to retrieve the host availability records 116. The host availability records 116 may be stored as data records in the database. In some embodiments, the available host identification logic 304 may retrieve the host availability records 116 from any computer storage structure configured to store the records 116. Having identified the hosts 106 available for use in servicing a request, the available host identification logic 304 may arrange the hosts 106 in a predetermined order. For example, the available host identification logic 304 may arrange values identifying each of the available hosts 106 in a list or array in order from lowest identification value to highest identification. The available host identification logic 304 may arrange the available hosts 106 according to any method that allows available hosts 106 to be arranged in the same order with respect to multiple received service requests.

The randomization logic 306 employs the list of available host produced by the available host identification logic 304 and the values extracted from the received request by the request parameter selection logic 302 to generate a randomized list of the available hosts 106. The randomization logic 306 initializes a random number generator with a seed value, where the seed value may be the value(s) extracted from the received request by the request parameter selection logic 302. The randomization logic 306 may request random values from the random number generator and apply the random values to rearrange (i.e., shuffle) the list of all available hosts 106 generated by the available host identification logic 304. For example, for each available host 106, the randomization logic 306 may request a random number from the number generator, and apply the random number as an index (e.g., random number mod list length) indicating a new location of the host 106 in the randomized host list. The randomization logic 306 may apply various constraints to the reordering to ensure that all of the available hosts 106 are represented in the randomized host list.

Because randomization is based on the seed value produced from values extracted from the service request. Each service request that includes identical values used to produce the seed value results in an identical sequence of random numbers. If the list of available hosts generated by the available host identification logic 304 is the same across service requests, then for service requests that produce the same seed value, the randomized host list generated by the randomization logic 306 will be identical.

The host selection logic 308 chooses a number of hosts from the randomized host list produced by the randomization logic 306 to serve as elements of the subset of hosts 106 that make up the shuffle shard used to service the request. For example, given a predetermined number of hosts 106 to include in the subset of hosts 106, the host selection logic 308 may choose the predetermined number of hosts 106 at the head of the randomized host list to make up the shuffle shard. Embodiments of the host selection logic 308 may apply any selection scheme to choose the hosts 106 from the randomized host list that allows for selection of the same hosts 106 given a same randomized host list across multiple service requests.

The request distribution logic 310 applies the subset of the randomized host list generated by the host selection logic 308 to service the received request. The request distribution logic 310 selects a host 106 of the subset to service the request based, at least in part, on the host state information 110. The request distribution logic 310 retrieves, from the host state repository 108, the host state information 110 for the hosts 106 of the host subset. The request distribution logic 310 analyzes the retrieved host state information 110 to determine which of the hosts 106 is to service the request. For example, the request distribution logic 310 may analyze health information for the hosts 106 of the subset and prioritize the hosts for selection in order of relative health. Similarly, the request distribution logic 310 may analyze the connectivity of the hosts 106 of the subset based on the host state information 110, and select the host 106 of the subset 118 having least connectivity to service the received request. Having selected one of the hosts of the subset to service the request, the request distribution logic 310 may feed information regarding selection of the host back the host state repository 108 for use in future host selection. The request distribution logic 310 passes the request to the selected host 106 for service. Should service of the request by the selected host 106 fail, request distribution logic 310 may select a different host 106 of subset and forward the request to the different host 106.

Figure 4:
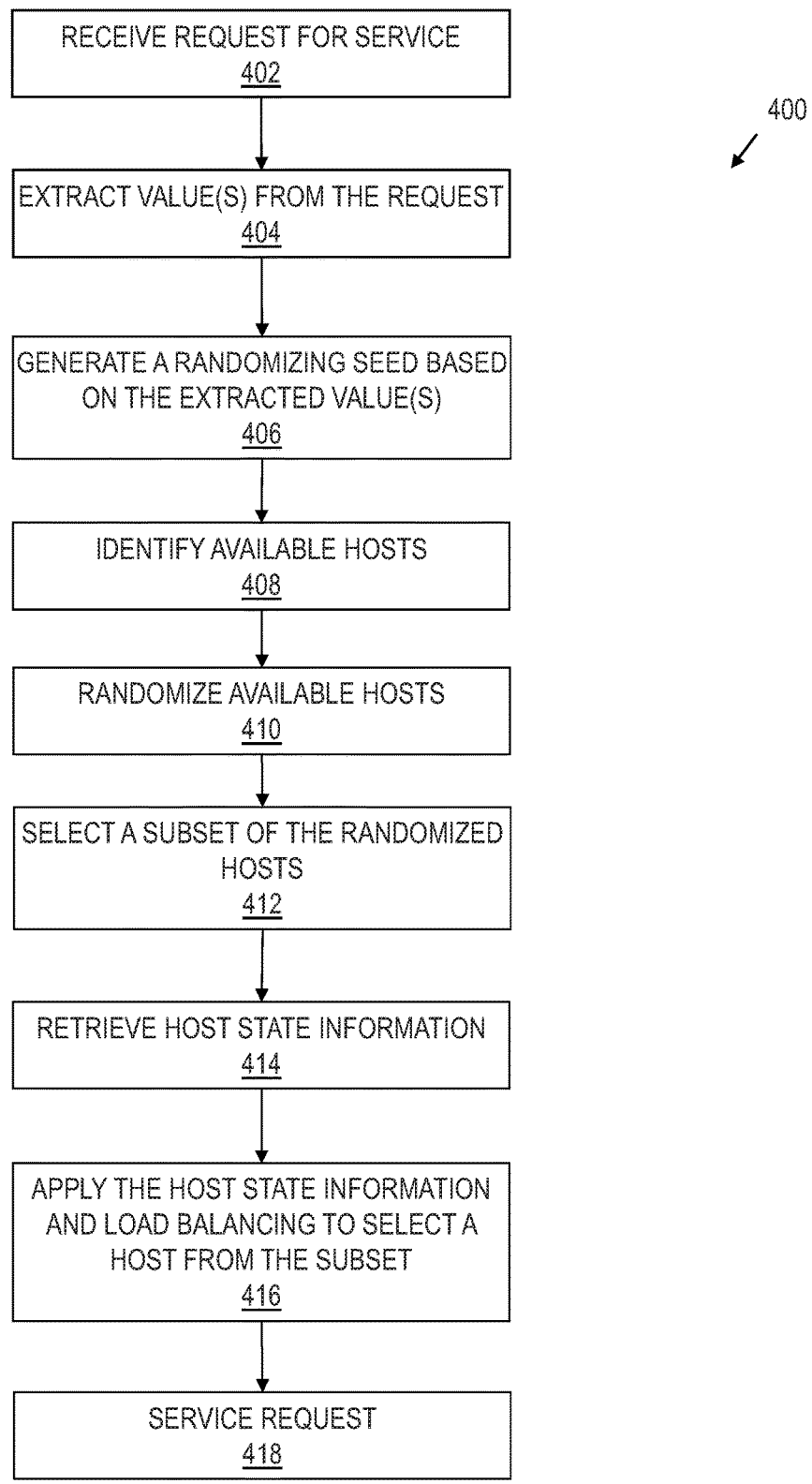
FIG. 4 shows a flow diagram for a method for shuffle sharded load balancing in accordance with various embodiments.

FIG. 4 shows a flow diagram for a method 400 for shuffle sharded load balancing in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer programmed to implement the shuffle sharded load balancer 102.

In block 402, the load balancer 102 receives a request for service. The request may be received from any of a plurality of sources that are coupled to the load balancer 102 via a network, such as a local area network, a wide area network, or other computer communication apparatus. The requests received by the load balancer 102 may be for a variety of related or unrelated services that are provided by disparate servers or service providers available to the load balancer 102.

In block 404, the load balancer 102 extracts from each received request a parameter to be applied to randomize the selection of hosts 106 used to service the request. Some embodiments of the load balancer 102 extract, from the received request, information identifying the source of the request. For example, the load balancer 102 may extract a source ID value, a source IP address, or other source identification information from the received request. Some embodiments of the load balancer 102 may extract from the request information identifying the service requested. For example, the load balancer 102 may extract from the request a value identifying the service requested.

In block 406, the load balancer 102 generates the seed value applied to initialize the random number generator that will be used to randomize the list of available hosts. In some embodiments, a value extracted from the received service request in block 404 may be applied as the randomizer seed. Some embodiments of the load balancer 102 may combine multiple values extracted from the received request to generate the randomizer seed. For example, the load balancer 102 may combine a value identifying the source of the request and a value identifying the service requested. The load balancer 102 may combine the multiple values by concatenation, addition, or any of a variety of other methods. Some embodiments may apply a hash to one or more values extracted from the service request to generate the randomizer seed.

In block 408, the load balancer 102 identifies the set of all hosts 106 available to service the received request. On receipt of a request for service, the load balancer 102 accesses the host availability records 116 which provide information identifying the hosts 106 of the host pool 104 that are available for use in servicing requests. The available hosts may change over time to accommodate removal of hosts 106 from service, replacement of aging or faulty hosts 106, addition of new hosts 106 to the host pool 104, etc. In some embodiments, the load balancer 102 may access a DNS server to retrieve the host availability records 116. The host availability records 116 may be stored as DNS records in the DNS server. In some embodiments, the load balancer 102 may access a database to retrieve the host availability records 116. The host availability records 116 may be stored as data records in the database. In some embodiments, the load balancer 102 may retrieve the host availability records 116 from any computer storage structure configured to store the records 116. Having identified the hosts 106 available for use in servicing a request, the load balancer 102 may arrange the hosts 106 in a predetermined order. For example, the load balancer 102 may arrange values identifying each of the available hosts 106 in a list or array in order from lowest identification value to highest identification. The load balancer 102 may arrange the available hosts 106 according to any method that allows that available hosts 106 to be arranged in the same order with respect to multiple received service requests.

In block 410, the load balancer 102 randomizes the list of available hosts 106 produced in block 408. The load balancer 102 initializes a random number generator with a seed value, where the seed value may be the value(s) extracted from the received request in block 404 and used to generate a seed value in block 406. The load balancer 102 may request random values from the random number generator and apply the random values to rearrange (i.e., shuffle) the list of all available hosts 106 generated by the load balancer 102 in block 408. For example, for each available host 106, the load balancer 102 may request a random number from the random number generator, and apply the random number as an index (e.g., random number mod list length) indicating a new location of the host 106 in the randomized host list. The load balancer 102 may apply various constraints to the reordering to ensure that all of the available hosts 106 are represented in the randomized host list.

In some embodiments, where the seed value is generated by applying a hash to the one or more values extracted from the service request, the seed value may be applied as an index (e.g., seed value mod list length) to rearrange the list of available hosts 106, or to select a host from the list of available hosts. The hash may be applied to the seed value to produce a second seed value to be used as a second index, the second seed value hashed to produce a third index, etc., where each successive seed value is applied as an index to rearrange the list of available hosts 106, or to select a host from the list of available hosts.

In block 412, the load balancer 102 selects a subset of the hosts from the randomized host list produced in block 410 to serve as elements of the subset of hosts 106 that make up the shuffle shard used to service the request. For example, given a predetermined number of hosts 106 to include in the subset of hosts 106, the load balancer 102 may choose the predetermined number of hosts 106 at the head of the randomized host list to make up the shuffle shard. Embodiments of load balancer 102 may apply any selection scheme to choose the hosts 106 from the randomized host list that allows for selection of the same hosts 106 given a same randomized host list across multiple service requests.

In block 414, the load balancer 102 retrieves, from the host state repository 108, the host state information 110 for the hosts 106 of the host subset produced in block 412. The load balancer 102 may retrieve the host state information 110 from host state repository 108 of the web services platform 100. The host state repository 108 may be provided in a database or other storage structure of the web services platform 100. The host state information 110 may include health information, operational state information, and other information applicable to use of the hosts 106 for servicing the request, such has information regarding past selection of each host to service a request.

In block 416, the load balancer 102 applies the host state information retrieved in block 414 to select a host 106 of the subset formed in block 412 to service the request. The load balancer 102 analyzes the retrieved host state information 110 to determine which of the hosts 106 is to service the request. For example, the load balancer 102 may analyze health information for the hosts 106 of the subset and prioritize the hosts for selection in order of relative health. Similarly, the load balancer 102 may analyze the connectivity of the hosts 106 of the subset based on the host state information 110, and select the host 106 of the subset 118 having least connectivity to service the received request. The load balancer 102 may analyze historical selection of the hosts 106 of the subset to select a successive host in round-robin fashion. The load balancer 102 may randomly select a host of the subset, or apply any other selection algorithm to balance loading across the hosts 106 of the subset. For example, some embodiments of the load balancer 102, may select a host 106 at random from a plurality of the hosts 106 of the subset that have health above a predetermined level, or select a host 106 having least connectivity from the hosts 106 of the subset that have health above a predetermined level. The predetermined level may be a number of faults or other quantitative measure of health.

In block 418, the load balancer 102 applies the host 106 selected in block 416 to service the received request. Additional details regarding application of the hosts 106 selected from the subset of hosts formed in block 412 is provided in method 500 of FIG. 5.

Figure 5:
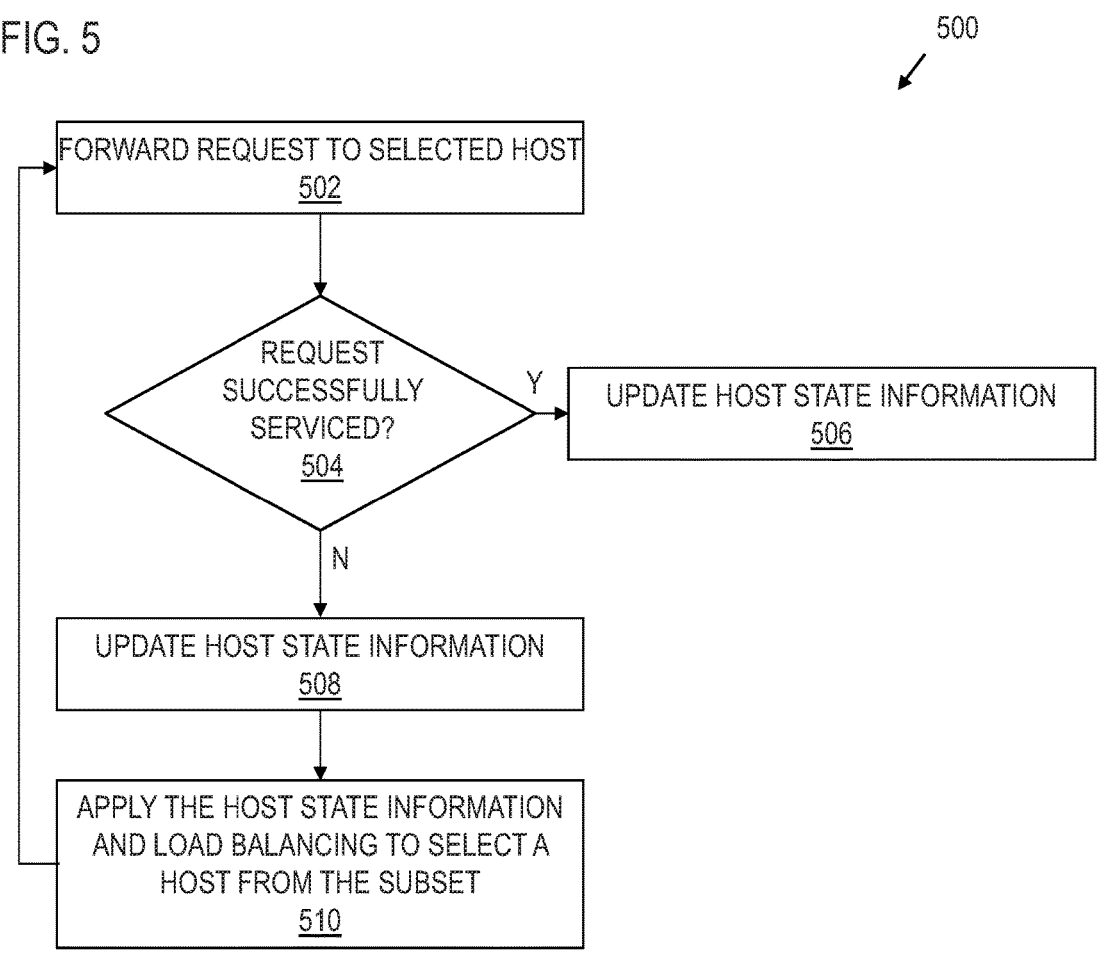
FIG. 5 shows a flow diagram for a method for applying a shuffle shard of service hosts to service a request in accordance with various embodiments.

FIG. 5 shows a flow diagram for a method 500 for applying a shuffle shard of service hosts to service a request in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer programmed to implement the shuffle sharded load balancer 102. The method 500 may be performed as part of the operations of block 418 of the method 400.

In block 502, the load balancer 102 has analyzed the host state information 110 and selected a host 106 of the subset of hosts 106 formed in block 412 of FIG. 4 to service the received request. The load balancer 102 forwards the request to the selected host 106 for service. The load balancer 102 may forward the request to the selected host 106 via a network, such as a local area network, a wide area network, or other computer communication apparatus. The load balancer 102 may update the host state information 110 for the selected host 106 for use in future host selection.

In block 504, the load balancer 102 determines whether the selected host 106 successfully serviced the request. For example, the load balancer 102 may implement a time-out for response from the selected host 106 or monitor the selected host 106 for state information indicative of service status. If the load balancer 102 determines that the selected host 106 has successfully serviced the request, then in block 506 the load balancer 102 may update the host state information 110 for the selected host 106 to reflect the successful service of the request.

If, in block 504, the load balancer 102 determines that the selected host 106 failed to successfully services the request, then, in block 508, the load balancer 102 may update the host state information 110 for the selected host 106 to reflect the failure of the selected host 106 to service the request.

In block 510, the load balancer 102 selects a different host 106 of the shard to service the request. The load balancer 102 applies the host state information 110 retrieved from the host state repository 108, in conjunction with the predetermined load balancing methodology, to select the different host 106 of the shard. For example, if the load balancer 102 is selecting a host 106 based on least connections, then the load balancer 102 may select the host 106 of the shard have the next fewest connections after the host 106 previously selected. If the load balancer 102 is selecting a host 106 based on a round robin scheme, then the load balancer 102 may select the host 106 of the shard scheduled for next selection. If load balancer 102 is randomly selecting a host 106, then a host 106 of the shard not previously selected to service the request may be randomly selected. Any implemented load balancing scheme may consider health of the hosts 106 in determining which host 106 is next select to service the request. Having selected a different host 106 of the shard, the load balancer 102 forwards the request to the different host in block 502. In this manner, the load balancer 102 may iteratively select the different hosts 106 of the shard to provide service in situations where one or more host 106 of the shard fails to provide service. For example, of a host 106 is shared between shards and a service of a request in a first shard has caused an error in the host 106 that makes the host 106 unable to service a request in a second shard, the load balancer 102 will attempt to service the request in the second shard using each host 106 of the second shard.

Figure 6:
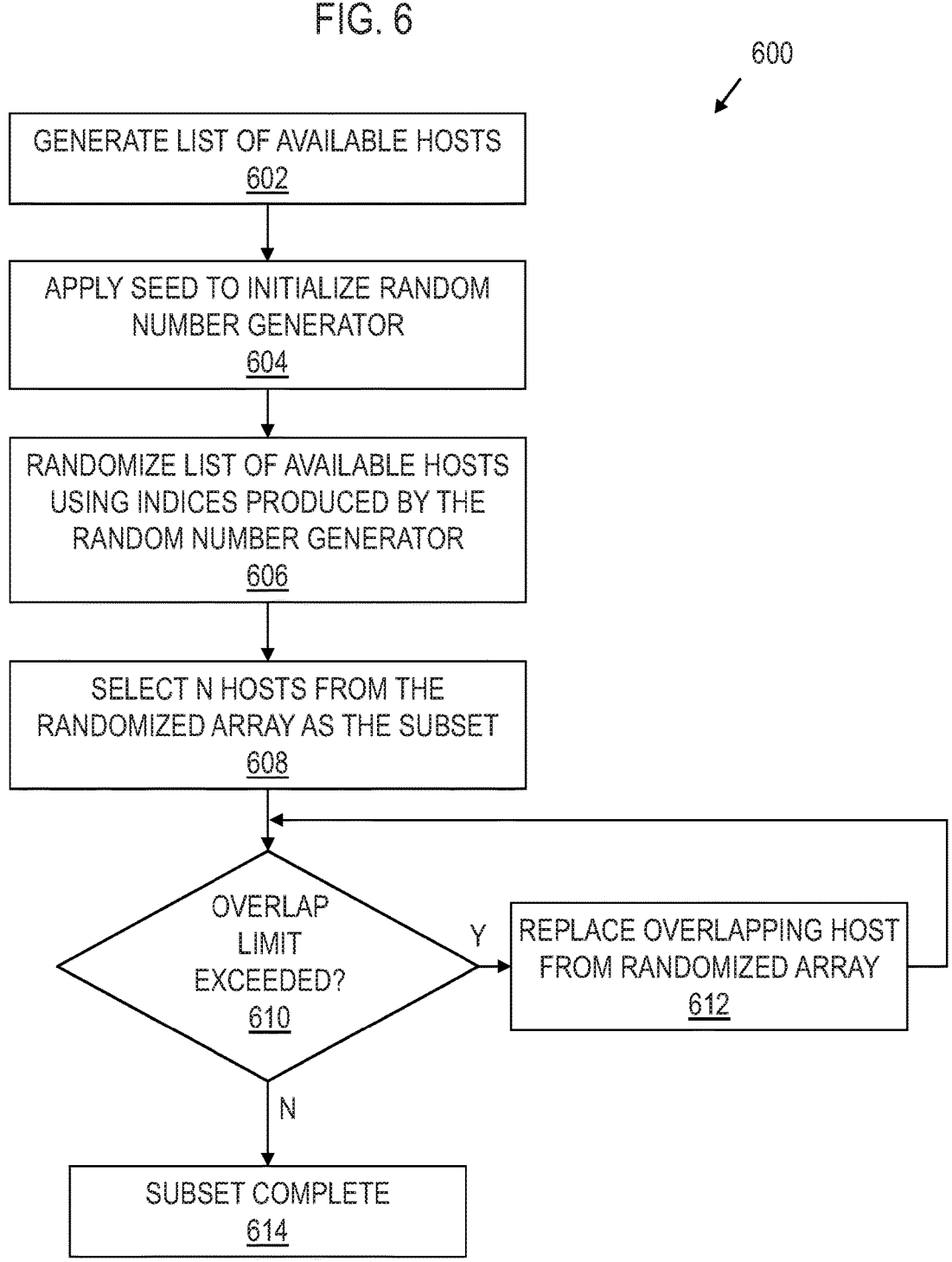
FIG. 6 shows a flow diagram for a method for generating a shuffle shard of service hosts in accordance with various embodiments.

FIG. 6 shows a flow diagram for a method 600 for generating a shuffle shard of service hosts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer programmed to implement the shuffle sharded load balancer 102. The method 600 is directed to selection of a random set of available hosts to service a request, and may be performed as part of the operations of block 408-412 of the method 400.

In block 602, the load balancer 102 identifies the set of all hosts 106 available to service the received request. On receipt of a request for service, the load balancer 102 accesses the host availability records 116 which provide information identifying the hosts 106 of the host pool 104 that are available for use in servicing requests. The available hosts may change over time to accommodate removal of hosts 106 from service, replacement of aging or faulty hosts 106, addition of new hosts 106 to the host pool 104, etc. In some embodiments, the load balancer 102 may access a DNS server to retrieve the host availability records 116. The host availability records 116 may be stored as DNS records in the DNS server. In some embodiments, the load balancer 102 may access a database to retrieve the host availability records 116. The host availability records 116 may be stored as data records in the database. In some embodiments, the load balancer 102 may retrieve the host availability records 116 from any computer storage structure configured to store the records 116. Having identified the hosts 106 available for use in servicing a request, the load balancer 102 may arrange the hosts 106 in a predetermined order. For example, the load balancer 102 may arrange values identifying each of the available hosts 106 in a list or array in order from lowest identification value to highest identification. The load balancer 102 may arrange the available hosts 106 according to any method that allows that available hosts 106 to be arranged in the same order with respect to multiple received service requests.

In block 604, the load balancer 102 initializes a random number generator for use in randomizing the list of available hosts 106. The initialization includes applying a seed value to the random number generator. The seed value may be value(s) extracted from the received request. For example, the seed value may a value extracted from the service request that is indicative of the source of the request and/or the service requested.

In block 606, the load balancer 102 randomizes the list of available hosts 106. The load balancer 102 may request random values from the random number generator and apply the random values to rearrange (i.e., shuffle) the list of all available hosts 106. For example, for each available host 106, the load balancer 102 may request a random number from the random number generator, and apply the random number as an index (e.g., random number mod list length) indicating a location of the host 106 in the randomized host list.

In block 608, the load balancer 102 selects a subset of the hosts from the randomized host list to serve as elements of the subset of hosts 106 that make up the shuffle shard to be used to service the request. For example, given that a shard is to include N hosts 106, the load balancer 102 may choose the N hosts 106 at the head of the randomized host list to make up the shuffle shard. Embodiments of the load balancer 102 may apply any selection scheme to choose the hosts 106 from the randomized host list that allows for selection of the same hosts 106 given a same randomized host list across multiple service requests.

Some embodiments of the load balancer 102 may constrain the number of hosts 106 in a shard that are common (i.e., overlap) to another shard. For example, if a shard includes a total of six hosts, then the load balancer 102 may constrain the shard to including no more than 1, 2, 3, 4, or 5 hosts in common with another shard. In block 610, the load balancer 102 determines whether the set of hosts 106 selected for the shard in block 608 exceeds the overlap limit. That is, if the shard is to include no more than four hosts in common with another shard, does the shard include five hosts in common with another shard. Determining whether the shard exceeds the overlap limit may be determined by comparing the host composition of the shard to the host composition of each other shard. Thus, the load balancer 102 may store the host composition of each shard. If set of hosts 106 selected for the shard exceeds the overlap limit, then in block 612, the load balancer 102 selects one of the overlapping hosts 106 and selects a next host 106 from the randomized host list to replace the overlapping host 106. The operations of blocks 610-612 may continue until the shard meets the predetermined overlap limit.

In block 614, the shard has been populated with the predetermined number of hosts 106. If an overlap limit is being applied, then the shard meets the overlap limit.

Figure 7:
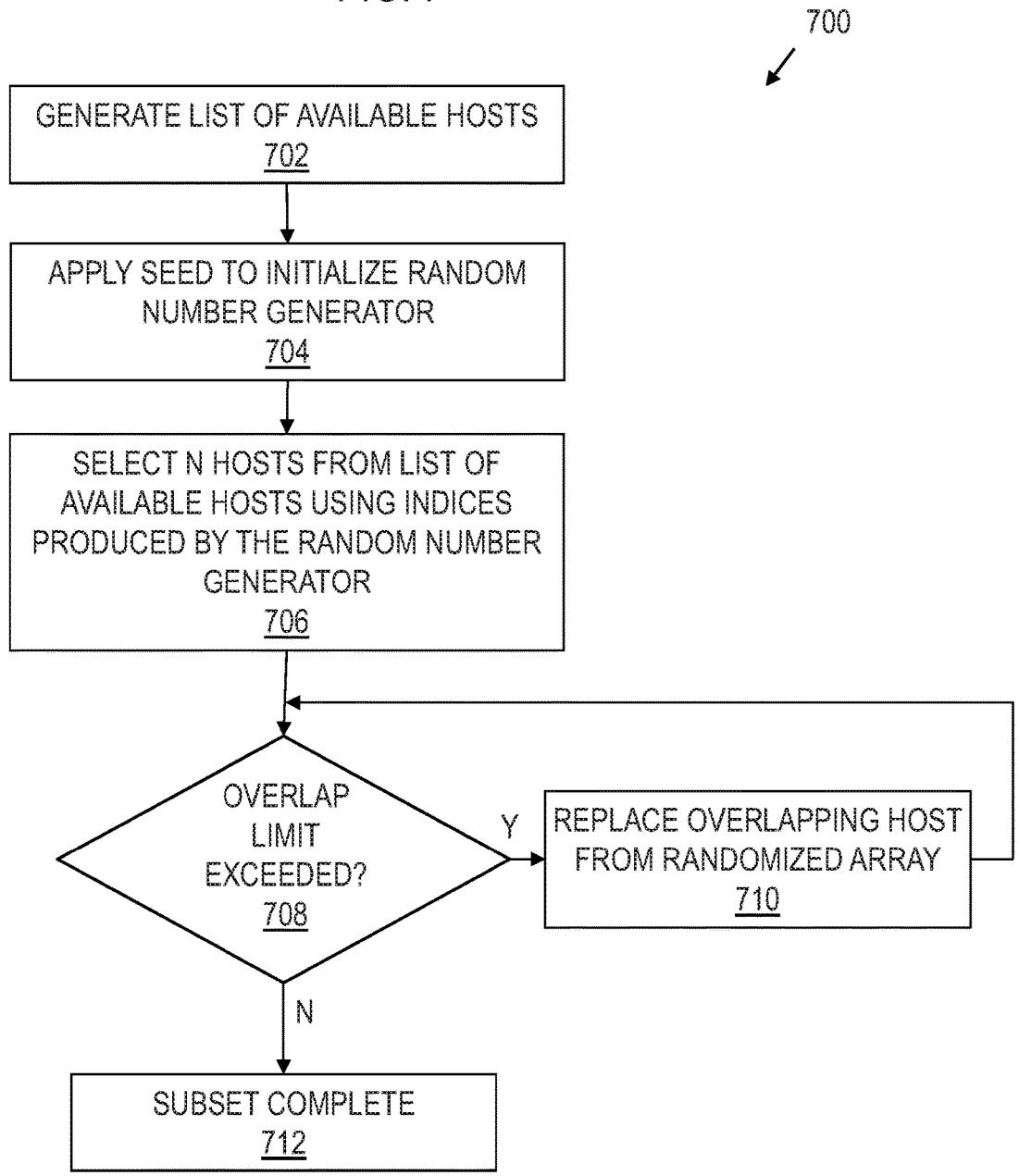
FIG. 7 shows a flow diagram for a method for generating a shuffle shard of service hosts in accordance with various embodiments.

FIG. 7 shows a flow diagram for a method 700 for generating a shuffle shard of service hosts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer programmed to implement the shuffle sharded load balancer 102. The method 700 is directed to selection of a random set of available hosts to service a request, and may be performed as part of the operations of block 408-412 of the method 400.

In block 702, the load balancer 102 identifies the set of all hosts 106 available to service the received request. On receipt of a request for service, the load balancer 102 accesses the host availability records 116 which provide information identifying the hosts 106 of the host pool 104 that are available for use in servicing requests. The available hosts may change over time to accommodate removal of hosts 106 from service, replacement of aging or faulty hosts 106, addition of new hosts 106 to the host pool 104, etc. In some embodiments, the load balancer 102 may access a DNS server to retrieve the host availability records 116. The host availability records 116 may be stored as DNS records in the DNS server. In some embodiments, the load balancer 102 may access a database to retrieve the host availability records 116. The host availability records 116 may be stored as data records in the database. In some embodiments, the load balancer 102 may retrieve the host availability records 116 from any computer storage structure configured to store the records 116. Having identified the hosts 106 available for use in servicing a request, the load balancer 102 may arrange the hosts 106 in a predetermined order. For example, the load balancer 102 may arrange values identifying each of the available hosts 106 in a list or array in order from lowest identification value to highest identification. The load balancer 102 may arrange the available hosts 106 according to any method that allows that available hosts 106 to be arranged in the same order with respect to multiple received service requests.

In block 704, the load balancer 102 initializes a random number generator for use in randomly selecting a subset of hosts 106 from the list of available hosts 106. The initialization includes applying a seed value to the random number generator. The seed value may be value(s) extracted from the received request. For example, the seed value may a value extracted from the service request that is indicative of the source of the request and/or the service requested.

In block 706, the load balancer 102 randomly selects a number of hosts 106 from the list of available hosts 106 to populate the shard that will service the request. The selection of hosts 106 from the list of available hosts 106 may be based on index values generated from random values provided by the random number generator. For example, if the load balancer 102 is to generate a shard that includes N randomly selected hosts 106, then the load balancer 102 may request N random values from the random number generator and apply each of the random values to retrieve a host 106 from the list of all available hosts 106, where the load balancer 102 applies each random value to generate an index as, for example, the random number mod list length.

Some embodiments of the load balancer 102 may constrain the number of hosts 106 in a shard that are common (i.e., overlap) to another shard. For example, if a shard includes a total of six hosts, then the load balancer 102 may constrain the shard to including no more than 1, 2, 3, 4, or 5 hosts in common with another shard. In block 708, the load balancer 102 determines whether the set of hosts 106 selected for the shard in block 706 exceeds the overlap limit. That is, if the shard is to include no more than four hosts in common with another shard, does the shard include five hosts in common with another shard. Determining whether the shard exceeds the overlap limit may be determined by comparing the host composition of the shard to the host composition of each other shard. If set of hosts 106 selected for the shard exceeds the overlap limit, then in block 710, the load balancer 102 selects one of the overlapping hosts 106 and selects a next host 106 from the randomized host list to replace the overlapping host 106. The operations of blocks 708-710 may continue until the shard meets the predetermined overlap limit.

In block 712, the shard has been populated with the predetermined number of hosts 106. If an overlap limit is being applied, then the shard meets the overlap limit.

Figure 8:
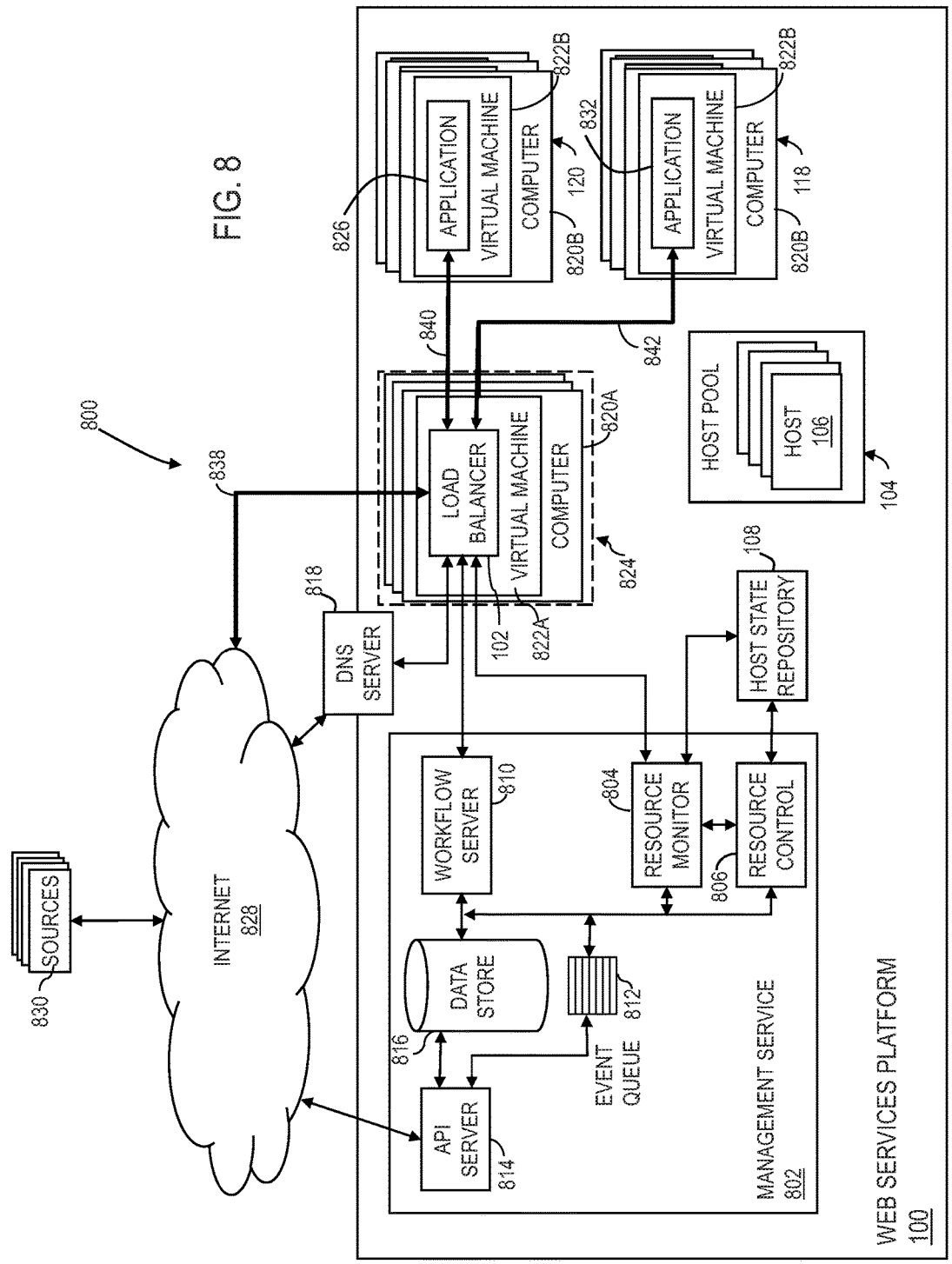
FIG. 8 shows a schematic diagram of a system architecture that includes shuffle sharded load balancing in accordance with various embodiments.

FIG. 8 shows a schematic diagram of a system architecture 800 that includes shuffle sharded load balancing in accordance with various embodiments. The system architecture 800 includes a web services platform 100 that communicates with request sources 830 via the network 828. The network 828 may be a local area network, a wide area network, the Internet, etc. The request sources 830 are entities that request services from the web services platform 100. In some embodiments of the system 800, the request sources 830 and the network 828 may be located within the web services platform 100. Each of the request sources 830 may include software programming executed by a computing device, where the software programming causes the computing device to generate and transmit requests for service to the web services platform 100. A computing device suitable for use as one of the request sources 830 may be a rack-mounted computer, a desktop computer, a laptop computer, a tablet computer, a smartphone, a virtual machine, containerized computing resources, or other computing device.

The DNS server 818 stores DNS records that may include network addresses (e.g., IP) addresses of servers that correspond to domain names. For example, DNS server 818 may receive domain name resolution requests from the request sources 830 for IP addresses via which services provided by the web services platform 100 may be accessed. On receipt of such a request, the DNS server 818 may perform a look-up function and return IP addresses to the request sources 830. The DNS records stored in the DNS server 818 may also identify the hosts 106 of the host pool 104 that are available for use by the load balancer 102 in populating shards to service requests received from the request sources 830.

The web services platform 100 includes a plurality of computers 820 (820A, 820B, etc.). The plurality of computers 820B comprises hosts 106 selected from the host pool 104 to execute applications 826 and 832 for servicing requests issued by the request sources 830. In an example embodiment, the web services platform 100 executes each instance of the application 126 in a host 106, where the host 106 may be a virtual machine 822B or a container (not illustrated). Each virtual machine 822 is executed by a computer 120B.

The web services platform 100 includes the virtual load balancer 824 to control distribution of requests 838 received from the request sources 830 to the applications 826 and 832, as requests 840 and 842. The load balancer 824 may be executed in one or more virtual machines 122A by one or more computers 120A. The web services platform 100 may scale load balancer 824 by increasing or decreasing the number of virtual machines 122A executing the load balancer 824. As the number of virtual machines 122A changes, the amount of computing resources applied to execute the virtual machines 122A also changes.

The load balancer 824 includes embodiments of the load balancer 102, and accordingly implements shuffle sharding for selection of the hosts 106 to be applied for servicing the requests 838. In the system 800, shards 118 and 120 are shown, with each of the shards 118 and 120 including a number of computers 820B and virtual machines 822B configured to service the requests 840 and 842 forwarded by the load balancer 824. On receipt of a service request 838, the load balancer 824 initiates construction of a shuffle shard to service the request by extracting from the request 824 a parameter to be applied to randomize the selection of hosts 106 for the shard. Some embodiments of the load balancer 824 extract, from the received request 838, information identifying the source 830 of the request 838. For example, the load balancer 824 may extract a source ID value, a source IP address, or other source identification information from the received request 838. Some embodiments of the load balancer 824 may extract, from the request 838, information identifying the service requested. For example, the load balancer 824 may extract from the request 838 a value identifying the service requested.

The load balancer 824 applies the parameter(s) extracted from the request 838 to generate a seed value to initialize the random number generator that will be used select the hosts 106 of the shard. In some embodiments, a value extracted from the received service request in block 404 may be applied as the randomizer seed. Some embodiments of the load balancer 824 may combine multiple values extracted from the received request to generate the randomizer seed.

For example, the load balancer 824 may combine a value identifying the source of the request and a value identifying the service requested. The load balancer 824 may combine the multiple values by concatenation, addition, or any of a variety of other methods. Some embodiments of the load balancer 824 may apply a hash to one or more values extracted from the service request to generate the randomizer seed.

The load balancer 824 identifies the set of all hosts 106 available to service the received request. To identify the set of all available hosts 106, the load balancer 824 may access the DNS server 818 and retrieve DNS records that identify the hosts 106 of the host pool 104 that are available for use in servicing requests. The available hosts may change over time to accommodate removal of hosts 106 from service, replacement of aging or faulty hosts 106, addition of new hosts 106 to the host pool 104, etc. Having identified the hosts 106 available for use in servicing a request, the load balancer 824 may arrange the hosts 106 in a predetermined order. For example, the load balancer 824 may arrange values identifying each of the available hosts 106 in a list or array in order from lowest identification value to highest identification. The load balancer 824 may arrange the available hosts 106 according to any method that allows that available hosts 106 to be arranged in the same order with respect to multiple received service requests.

The load balancer 824 randomizes the list of available hosts 106. The load balancer 102 initializes a random number generator with the seed value generated using the value(s) extracted from the received request 838. The load balancer 824 may request random values from the random number generator and apply the random values to rearrange (i.e., shuffle) the list of all available hosts 106 generated by the load balancer 824. For example, for each available host 106, the load balancer 824 may request a random number from the random number generator, and apply the random number as an index (e.g., random number mod list length) indicating a new location of the host 106 in the randomized host list.

The load balancer 824 selects a subset of the hosts 106 from the randomized host list to populate the shard 118 or 120. For example, given a predetermined number of hosts 106 to include in the subset of hosts 106, the load balancer 824 may choose the predetermined number of hosts 106 at the head of the randomized host list to make up the shuffle shard. Embodiments of load balancer 824 may apply any selection scheme to choose the hosts 106 from the randomized host list that allows for selection of the same hosts 106 given a same randomized host list across multiple service requests.

With completion of shard host selection, the load balancer 824 selects a host 106 of the shard to service the request 838. The load balancer 824 retrieves, from the host state repository 108, the host state information 110 for the hosts 106 of the host subset. The load balancer 824 may retrieve the host state information 110 from host state repository 108 of the web services platform 100. The host state repository 108 may be provided in a database or other storage structure of the web services platform 100. The host state information 110 may include health information, operational state information, and other information applicable to use of the hosts 106 for servicing the request, such as information regarding past selection of each host 106 to service a request. The load balancer 824 applies the host state information retrieved from the host state repository 108 to select a host 106 of the shard to service the request. The load balancer 824 analyzes the retrieved host state information 110 to determine which of the hosts 106 is to service the request. For example, the load balancer 102 may analyze health information for the hosts 106 of the subset and prioritize the hosts 106 for selection in order of relative health, or exclude some hosts 106 from selection based on health values being below a predetermined health threshold.

The load balancer 824 may further select a host 106 to which to forward the request 838 by random selection, round robin distribution, least current connections, or one or more of the traffic distribution algorithms. For example, for routing requests, the load balancer 124 may take into account factors, such as an application's reported load, recent response times, number of active connections, geographic location, number of requests an application has recently been assigned, etc. The load balancer 824 forwards the received service request 838 to the selected host 106 for service.

The web services platform 100 includes a management service 802 that controls operation of and allocation of computing resources to the load balancer 824 and other computing devices of the web services platform. The management service 802 includes an API server 814, a data store 816, an event queue 812, a workflow server 810, a resource control service 806, and a resource monitor 804. The resource monitor 804 and the resource control service 806 collectively form a resource manager that directs the allocation of computing resources in the web services platform 100. The API server 814 receives and configures the management service 802 to execute the requests. For example, the API server 814 may receive a request to create a load balancer 824, modify the load balancer 824, configure the load balancer 824, etc. On receipt of such a request, the API server 814 may store parameters received as part of the request in the data store 816. The data store 816 provides persistent storage for parameters of the load balancer 824 and can be implemented using a database or database service or a block or object store. Parameters received as part of a request may include parameters for configuring the load balancer 824, a request identifier, an identifier for the requestor and parameters specific to the load balancer 824. For example, the parameters may include values related to controlling the amount of computing resources to allocate to the load balancer 824. The API server 814 may also store an event flag in the event queue 812 to indicate that an operation is to be performed with respect to the load balancer 824. The event queue 812 stores flags that trigger the workflow server 810 to perform an operation.

The workflow server 810 manages the load balancer 824 based on the information stored in the data store 816. For example, the workflow server 810 may create a virtual machine 822A and an instance of the load balancer 824 as needed to route requests received from the request sources 830, modify existing instances of the load balancer 824, etc. based on the information stored in the data store 816. In a specific example, this can include configuring the workflow server 810 with executable code that causes it to access the data store 816 and/or the event queue 812 to check for new requests. The workflow server 810 monitors the event queue 812 for flags indicating that an operation affecting the load balancer 824 is to be performed. If the workflow server 810 reads an event flag from the event queue 812, the workflow server 810 may perform operations to configure the load balancer 824 as indicated by the parameters stored in the data store 816. For example, in response to reading an event flag from the event queue 812, the workflow server 810 may assign an amount of computing resources for use by the load balancer 824 by creating a virtual machine 122A and executing a load balancer node 102 on the virtual machine 122A.

The resource monitor 804 tracks the operation of the load balancer 824 and the hosts 106 over time to provide health, utilization, and operational state information for components of the web services platform 100. For example, the resource monitor 804 may store health utilization, and operational status information and metrics for the hosts 106 of the host pool 104 in the host state repository 108. Each host 106 can be assigned an internal identifier that is associated with the metrics for the host 106. Each host 106 may include an agent that measures health, utilization, and/or operational state of the host 106. Such an agent may periodically measure utilization of computer resources by the host 106 and transfer resource utilization measurements to the resource monitor 104. The resource monitor 104 may store the individual measurements in the host state repository 108. Similarly, the load balancer 824 may provide information to the resource monitor 804 regarding selection of hosts 106 for servicing a request 838. Such information may include selection sequence for use in round-robin load balancing, and request service status.

A request associated with the load balancer 824 may specify various parameters that affect the operation of the resource control service 806. Parameters associated with the load balancer 824, as specified by a customer utilizing the load balancer 824 or administrator of the web service platform 100, may be stored in the data store 816 (e.g., in association with other parameters applicable to the load balancer 824) and referenced by the resource control service 806 to manage adjustments to the computing resources of the load balancer 824. For example, a customer may specify a load balancing algorithm to be applied, a number of hosts 106 per shard, a maximum number of overlapping hosts 106 per shard, etc.

Figure 9:
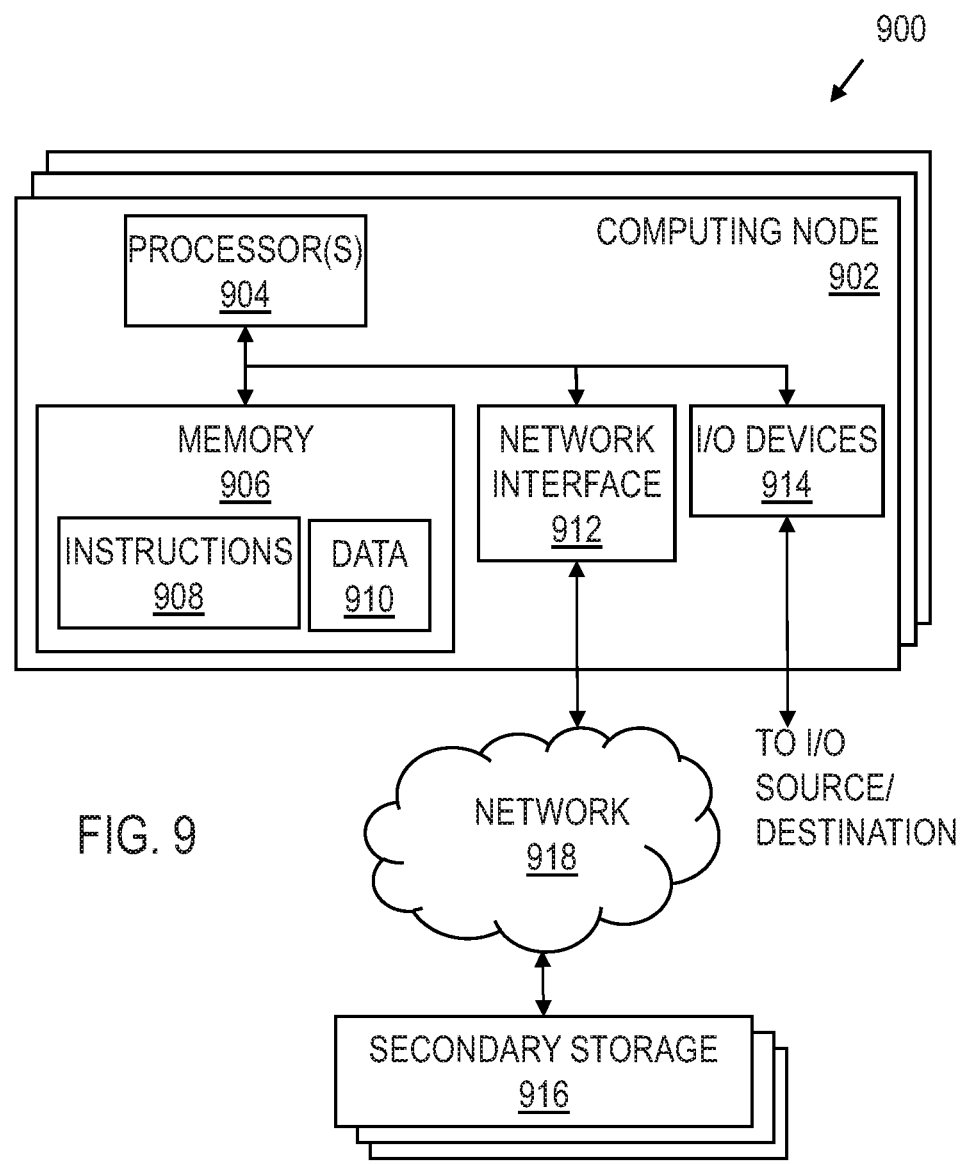
FIG. 9 shows a schematic diagram for a computing system suitable for implementation of a shuffle sharded load balancer in accordance with various embodiments.

FIG. 9 shows a schematic diagram for a computing system 900 suitable for implementation of a shuffle sharded load balancer in accordance with various embodiments. The computing system 900 includes one or more computing nodes 902 and secondary storage 916 that are communicatively coupled via a network 918. One or more of the computing nodes 902 and associated secondary storage 916 may be applied to provide the functionality of the web services platform 100, including the shuffle sharded load balancer 102, 824, the hosts 106, the management service 802, the resource monitor 804, the resource control service 806, the workflow server 810, the API server 814, the data store 816, the event queue 812, the DNS server 818, the host state repository 108, etc.

Each computing node 902 includes one or more processors 904 coupled to memory 906, network interface 912, and I/O devices 914. In some embodiments of the system 900, a computing node 902 may implement the functionality of more than one component of the systems 100 or 800. In various embodiments, a computing node 902 may be a uniprocessor system including one processor 904, or a multiprocessor system including several processors 904 (e.g., two, four, eight, or another suitable number). Processors 904 may be any suitable processor capable of executing instructions. For example, in various embodiments, processors 904 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 904 may commonly, but not necessarily, implement the same ISA. Similarly, in a distributed computing system such as one that collectively implements the web services platform 100, each of the computing nodes 902 may implement the same ISA, or individual computing nodes and/or replica groups of nodes may implement different ISAs.

The memory 906 may include a non-transitory, computer-readable storage medium configured to store program instructions 908 and/or data 910 accessible by processor(s) 904. The system memory 906 may be implemented using any suitable memory technology, such as static random access memory (SRAM), synchronous dynamic RAM (SDRAM), nonvolatile/Flash-type memory, or any other type of memory. Program instructions 908 and data 910 implementing the functionality disclosed herein are stored within system memory 906. For example, instructions 908 may include instructions that when executed by processor(s) 904 implement the shuffle sharded load balancer 102, 824, the hosts 106, the management service 802, the resource monitor 804, the resource control service 806, the workflow server 810, the API server 814, the data store 816, the event queue 812, the DNS server 818, the host state repository 108, and/or other components of the web services platform 100 disclosed herein.

Secondary storage 916 may include volatile or non-volatile storage and storage devices for storing information such as program instructions and/or data as described herein for implementing the web services platform 100. The secondary storage may include various types of computer-readable media accessible by the computing nodes 902 via the network 918. A computer-readable medium may include storage media or memory media such as semiconductor storage, magnetic or optical media, e.g., disk or CD/DVD-ROM, or other storage technologies. Program instructions and data stored on the secondary storage 916 may be transmitted to a computing node 902 for execution by a processor 904 by transmission media or signals via the network 918, which may be a wired or wireless network or a combination thereof.

The network interface 912 may be configured to allow data to be exchanged between computing nodes 902 and/or other devices coupled to the network 918 (such as other computer systems, communication devices, input/output devices, or external storage devices). The network interface 912 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 914 may include one or more display terminals, keyboards, keypads, touchpads; scanning devices, voice or optical recognition devices, or any other devices suitable for entering or retrieving data by one or more computing nodes 902. Multiple input/output devices 914 may be present in a computing node 902 or may be distributed on various computing nodes 902 of the system 900. In some embodiments, similar input/output devices may be separate from computing node 902 and may interact with one or more computing nodes 902 of the system 100 through a wired or wireless connection, such as over network interface 912.

Those skilled in the art will appreciate that computing system 900 is merely illustrative and is not intended to limit the scope of embodiments. In particular, the computing system 900 may include any combination of hardware or software that can perform the functions disclosed herein, including computers, network devices, internet appliances, PDAs, wireless phones; pagers, etc. Computing node 902 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a plurality of computing devices configurable to implement a compute instance of a provider network; and
 a computing device configured to implement a load balancer that allocates the computing devices to service requests received by the load balancer, the load balancer configured to:
  receive service requests from a plurality of sources;

extract from each received service request a parameter related to a source of the request, the parameter selected to remain constant over service requests received from the source;
generate a randomizing seed as a function of the parameter;
select, based on the randomizing seed, a first subset of the plurality of computing devices to be used to service the request, the first subset comprising more than one and fewer than all of the plurality of computing devices; and
forward the request to a selected computing device of the first subset of the computing devices for service.

2. The system of claim 1, wherein the load balancer is configured to select the computing devices of the first subset such that no more than a predetermined number of the computing devices of the first subset are assigned to a different subset of the computing devices for servicing a request received from a different source.

3. The system of claim 1, wherein the load balancer is configured to:
identify the parameter as related to a given source that utilizes more than a predetermined amount of computing resources; and
responsive to identification of the given source:
modify the parameter to produce a modified parameter;
generate an additional randomizing seed as a function of the modified parameter;
select, based on the additional randomizing seed, a second subset of the plurality of computing devices, wherein the second subset and the first subset are disjoint; and
incorporate the second subset into the first subset.

4. The system of claim 1, further comprising a computing device information repository configured to store state information for each of the computing devices; wherein the load balancer is further configured to:
retrieve the state information for each computing device of the first subset of computing devices from the computing device information repository, and
analyze the state information to identify the selected computing device, wherein the analysis comprises:
identifying the selected computing device as a computing device of the first subset of computing devices having fewest connections to service requesters;
identifying the selected computing device as a next sequential computing device of the first subset of computing devices to be selected for service; or
identifying the selected computing device as a random computing device of the first subset of computing devices having a measure of health exceeding a predetermined threshold.

5. A method comprising:
configuring a plurality of computing devices to implement a compute instance of a provider network;
configuring a computing device to implement a load balancer that allocates the computing devices to service requests received by the load balancer;
receiving, by the load balancer, requests for service from a plurality of sources;
extracting, by the load balancer, a parameter from each received service request, wherein the parameter is related to a source of the received service request and is selected to remain constant over service requests received from the source;
selecting, by the load balancer, based on the parameter, a first subset of the plurality of computing devices to be used to service the request; and
forwarding, by the load balancer, the request to a selected computing device of the first subset of the computing devices for service.

6. The method of claim 5, further comprising:
accessing, by the load balancer, a computing device information repository storing state information for each of the computing devices;
retrieving the state information for each computing device of the first subset of computing devices from the computing device information repository, and
analyzing the state information to identify the selected computing device, wherein the analysis comprises:
identifying the selected computing device as a computing device of the first subset of computing devices having fewest connections to service requesters;
identifying the selected computing device as a next sequential computing device of the first subset of computing devices to be selected for service; or
identifying the selected computing device as a random computing device of the first subset of computing devices having a measure of health exceeding a predetermined threshold.

7. The method of claim 5, further comprising:
generating, by the load balancer, a randomizing seed as a function of the parameter; and
selecting computing devices of the first subset based on the randomizing seed;
wherein the first subset comprises more than one and fewer than all of the plurality of computing devices.

8. The method of claim 5, further comprising selecting, by the load balancer, the computing devices of the first subset such that no more than a predetermined number of the computing devices of the first subset are assigned to a different subset of the computing devices for servicing a request received from a different source.

9. The method of claim 5, wherein the parameter is one of a source identifier, an internet protocol address, or an identifier of a service to be provided to fulfill the service request.

10. The method of claim 5, further comprising:
identifying, by the load balancer, the parameter as related to a source that utilizes more than a predetermined amount of computing resources;
selecting a second subset of the plurality of computing devices to service the request, wherein the second subset does not intersect the first subset; and
incorporating the second subset into the first subset.

11. The method of claim 10, further comprising:
modifying the parameter to produce a modified parameter;
generating an additional randomizing seed as a function of the modified parameter; and
selecting, based on the additional randomizing seed, the second subset of the plurality of computing devices.

12. A system, comprising:
a load balancer that allocates computing devices to service requests received by the load balancer, the load balancer configured to:
receive service requests from a plurality of sources;
extract a parameter from each received service request;
select, based on the parameter, a first subset of the computing devices to be used to service the request;

assign the same computing devices to the first subset for a plurality of service requests that include a same value of the parameter; and forward the request to a selected computing device of the first subset of the computing devices for service.

13. The system of claim 12, wherein the load balancer is configured to:

apply the parameter as a seed value to a random number generator to generate a randomizing seed; and select, the first subset based on the randomizing seed.

14. The system of claim 12, wherein the load balancer is configured to select the computing devices of the first subset such that no more than a predetermined number of the computing devices of the first subset are assigned to a different subset of the computing devices for servicing a request received from a different source.

15. The system of claim 12, wherein the load balancer is configured to forward the request to a second computing device of the first subset responsive to failure of the selected computing device in service of the request.

16. The system of claim 12, wherein the load balancer is configured to:

identify the parameter as related to a source that utilizes more than a predetermined amount of computing resources;

select a second subset of the plurality of computing devices to service the request, wherein the second subset does not intersect the first subset; and incorporate the second subset into the first subset.

17. The system of claim 16, wherein the load balancer is configured to:

modify the parameter to produce a modified parameter;

generate an additional randomizing seed as a function of the modified parameter; and select, based on the additional randomizing seed, the second subset of the plurality of computing devices.

18. The system of claim 12, wherein the parameter is one of a source identifier, an internet protocol address, or a service to be to be provided to fulfill the service request.

* * * * *